US004001661B2

United States Statutory Invention Registration [19]

[11] Reg. Number: H1661

Koff et al.

[45] Published: Jul. 1, 1997

[54] ION EXCHANGE REMOVAL OF CATIONS UNDER CHELATING/COMPLEXING CONDITIONS

[75] Inventors: Jennie L. Koff; Daniel A. Zarate, both of Oxnard, Calif.

[73] Assignee: The United States of America as represented by the Secretary of the Navy, Washington, D.C.

[21] Appl. No.: 300,288

[22] Filed: Aug. 30, 1994

[51] Int. Cl.[6] ..... B01J 49/00

[52] U.S. Cl. ..... 210/670; 210/684; 210/912

[58] Field of Search ..... 210/663, 669, 210/670, 683, 684, 685, 686, 687, 688, 904, 912

[56] References Cited

U.S. PATENT DOCUMENTS

| | | | |
|---|---|---|---|
| 2,980,607 | 4/1961 | Mock et al. | 210/684 |
| 3,148,947 | 9/1964 | Fleischmann | 210/684 |
| 3,969,244 | 7/1976 | Kobayashi et al. | 210/688 |
| 3,984,314 | 10/1976 | Fries | 423/24 |
| 4,123,340 | 10/1978 | Kammel et al. | 204/149 |
| 4,159,235 | 6/1979 | Kammel et al. | 204/272 |
| 4,250,031 | 2/1981 | Uejima et al. | 210/688 |
| 4,303,704 | 12/1981 | Courduvelis et al. | 210/662 |
| 4,417,987 | 11/1983 | Harrison | 210/759 |
| 4,448,694 | 5/1984 | Plueddemann | 210/682 |
| 4,537,937 | 8/1985 | Cawlfield et al. | 525/417 |
| 4,723,998 | 2/1988 | O'Neil | 75/101 |
| 4,863,612 | 9/1989 | Kirman et al. | 210/662 |
| 4,867,882 | 9/1989 | O'Neill et al. | 210/684 |
| 5,055,199 | 10/1991 | O'Neill et al. | 210/684 |
| 5,073,575 | 12/1991 | Blanch et al. | 521/33 |
| 5,108,615 | 4/1992 | Hosea et al. | 210/688 |
| 5,147,617 | 9/1992 | Touro et al. | 423/27 |
| 5,180,822 | 1/1993 | McQuigg et al. | 546/788 |
| 5,187,200 | 2/1993 | Rainer | 524/30 |
| 5,198,021 | 3/1993 | Virnig | 75/744 |
| 5,200,473 | 4/1993 | Jeanneret-Gris | 525/381 |
| 5,215,575 | 6/1993 | Butler | 75/744 |
| 5,259,960 | 11/1993 | Beck et al. | 210/638 |
| 5,262,018 | 11/1993 | Meadow et al. | 204/82 |
| 5,269,905 | 12/1993 | Reynolds | 205/101 |
| 5,409,582 | 4/1995 | Wimbish et al. | 204/106 |

OTHER PUBLICATIONS

Amberlite IRC–718 Technical Brochure –Rohm and Haas 1993.

Cyanide Removal Technical Brochure –Rohm and Haas.

Amber–hi–lites, No. 162, Ion Exchange in Heavy Metals Removal and Recovery –Rohm and Haas; Walter H. Waitz, Jr., pp. 1–8.

*Primary Examiner*—Ngoclan Mai
*Assistant Examiner*—John R. Hardee
*Attorney, Agent, or Firm*—Melvin J. Sliwka; Ron Billi

[57] ABSTRACT

A process for removing complexed or chelated ions from an aqueous solution using a cationic chelating resin in the sodium form. The process is particularly useful for removing metal ions chelated during a metal plating process with specific utility for recovering cadmium from a cadmium cyanide complex.

23 Claims, 1 Drawing Sheet

Figure 1:
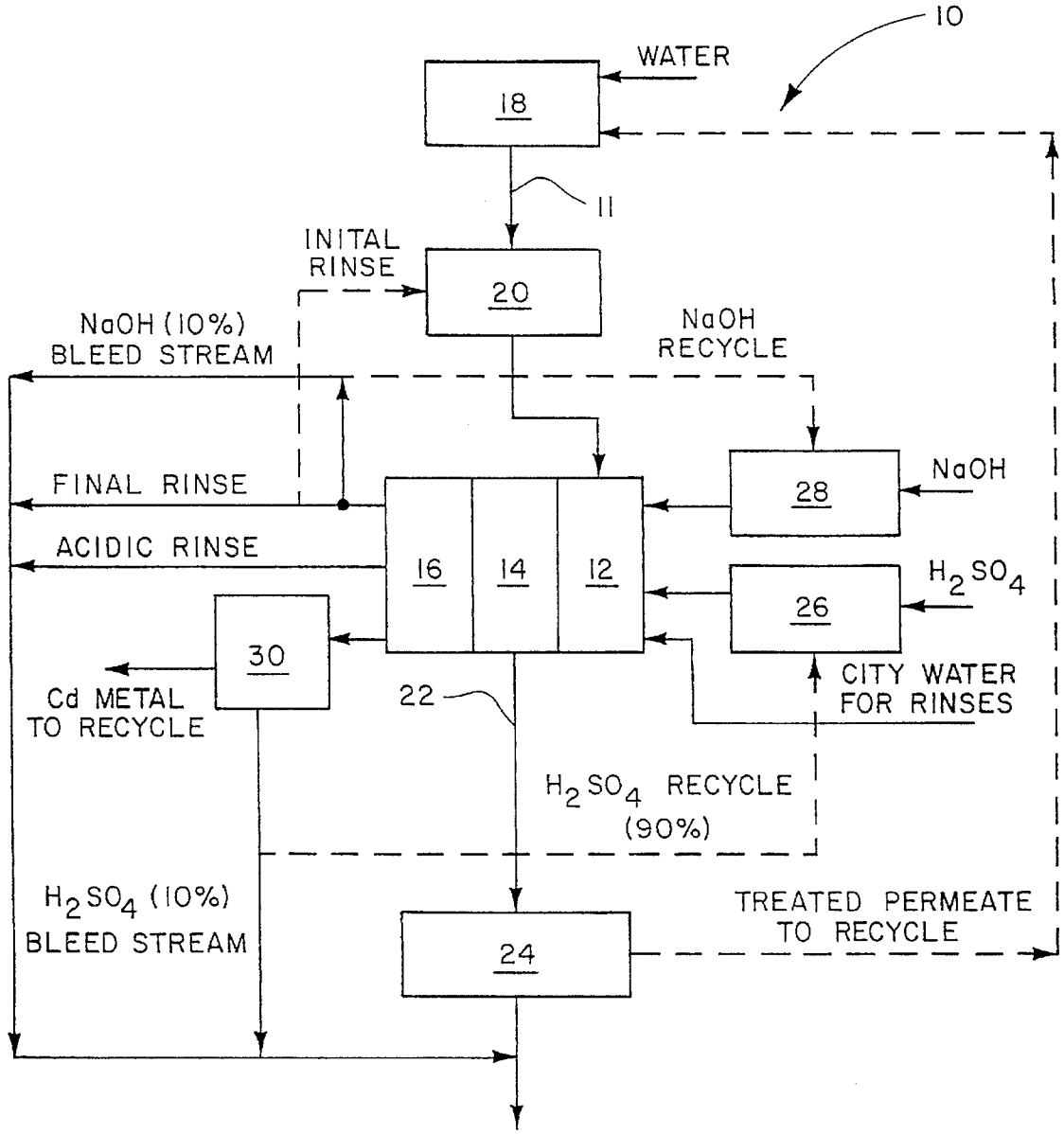

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ION EXCHANGE REMOVAL OF CATIONS UNDER CHELATING/COMPLEXING CONDITIONS

BACKGROUND

The present invention relates to a process for removing complexed or chelated cations from an aqueous solution using a cationic ion exchange resin. In particular, the invention relates to a process for removing heavy metal cations from a chelate or complex with cyanide and, more particularly, cadmium from a cadmium cyanide complex dissolved in the aqueous effluent of a plating bath such that the cadmium can be recycled or recovered for reuse and the cyanide is recycled or converted to a form which can be disposed of with minimal effect on the environment.

Electroplating baths are used to plate numerous different metals, such as cadmium, copper, zinc, silver, gold and nickel, on to a conductive substrate. One of the major problems with the use of electroplating baths is the need to dispose of high volumes of metals complexed or chelated with cyanides (referred to below as the cyanide complex) which are generated in the process and are present in the waste streams. The most common method of treating this waste stream is to react the cyanide complex with chlorine in the form of chlorine gas, sodium hypochlorite or calcium hypochlorite followed by the addition of an alkali, such as caustic soda, to raise the pH to 9 to 11 to convert the cyanide to cyanate and then to $CO_2$ and $N_2$, releasing the metal ion from the complex in the process. An alternative method is the use of ozone and hydrogen peroxide. The solution is then treated with hydroxide to form an insoluble precipitate of the heavy metal, the resulting metal hydroxide sludge being disposed of as hazardous waste as it is not in a form which can be readily recovered, recycled or reused.

An alternative recovery process involves the use of an ion exchange resin to remove certain ionic materials. Ion exchange resins are polymeric materials which have charged functional groups exposed to the aqueous feed stream. The charge on the functional group determines the type of ions which can be attracted by the resin. For example, some cationic resins typically contain sulfonic acid groups which are negatively charged and thus attract positively charged cations. Some anionic resins contain amine-based functional groups which are positively charged and thus attract anionic groups. Thus, anionic ion exchange resin can be used in place of alkaline chlorination to remove free cyanide as well as cyanide complexes such as $Cd(CN)_4^{-2}$, $Zn(CN)_4^{-2}$, $Fe(CN)_4^{-2}$, or $Fe(CN)_6^{-4}$. However, these complexes are strongly bound to the anionic resin and not readily removed by standard NaOH resin regeneration treatment, resulting in rapid degeneration of the resin and a short useful processing life.

Cationic resins can be used to remove cations from solution after the complex is broken with subsequent release by acid treatment. As an example, the Rohm and Haas Company markets Amberlite® IRC-178 chelating resin for the removal of cations from aqueous solutions. To obtain high selectivity the most effective operative conditions require the use of a highly acidic solution (pH=2.0), the selectivity rapidly decreasing as the pH is raised to neutral or basic. Other published material (U.S. Pat. Nos. 5,262,018 and 5,200,473) disclose that iminodiacetic acid resins produced by numerous other manufacturers, N-hydroxypropyloicolylamine functionalized chloromethylated polymer (Dowex® XFS-415 and XFS-43084) and chelating resins with amino phosphoric acid functional groups (Duolite® C-467) behave similarly for removing free ions of transition metals over the pH range of 0.5 to 4.0.

While strong acid cationic resins in the hydrogen form can be used to remove complexed heavy metals, strong acid cationic resins in the sodium form will not remove complexed heavy metals. However, when used on cyanide complexing solutions, the hydrogen form of cationic resins cause the cyanide complex to break down and release hydrogen cyanide gas which is highly toxic.

U.S. Pat. No. 5,200,473 to Jeanneret-Gris suggests that a chelating resin may be used to draw a metal ion out of a weak complex. However, complexes of metals with cyanide are extremely stable and known chelating resins can be unsuitable and undesirable when they produce toxic gases. In fact, such resins can be regenerated by washing the resin with a basic pH solution of cyanide ions, reversing the attraction of the chelating resin for the metal, i.e., forming instead of breaking the cyanide/metal ion complex.

U.S. Pat. No. 5,198,021 discloses the use of a guanidine based resin specifically designed to recover gold or silver complexed with cyanide. However, this resin, which is a hydrogen form resin, suffers from at least two deficiencies—the exchange results in the formation of highly toxic HCN gas and regeneration of the resin, i.e., removal of the absorbed metal, is performed using NaOH which would produce heavy metal hydroxides from which the free metal is not readily recovered.

Thus there is a need for a safe, economical, and reliable process which will allow the recovery of high volumes of heavy metals from wastewater streams in a form suitable for recovery or recycling while at the same time avoiding the production of hazardous waste and toxic gases.

SUMMARY

These needs are met by the present invention which comprises the use of a chelating type cationic resin to directly treat an aqueous solution of a metal cyanide complex. The process comprises passing a highly basic (pH≧8.5) aqueous stream of soluble, cyanide complexed metal solution over a chelating cationic resin in the sodium form preferentially including an iminodiacetic acid chelating agent which causes the removal of the metal ion from the cyanide complex, regenerating the resin by washing with a strong acid, such as hydrochloric or sulfuric acid, to form an acidic solution of the metal. The metal ion can be recovered as elemental metal by passing the solution through an electrolytic bath where the metal is deposited on the cathode. The cyanide can be removed using an anionic resin or destroyed by a standard chlorination processing. The chelating resin can then be reactivated by treatment with a base such as NaOH.

DRAWINGS

These and other features, aspects and advantages of the present invention will become better understood with reference to the following description, appended claims, and accompanying drawings, where:

FIG. 1 is a schematic drawing showing a process according to the invention.

DESCRIPTION

It is known that a sodium type cationic resin will remove ions from an acidic solution, but that the resin will not exchange the sodium for the metal ion when it is complexed with cyanide. Unexpectedly, it has been found that when a highly basic solution of a negatively charged, metal complex is passed over a cationic chelating type resin the metal is removed from the cyanide complex, resulting in the metal being bound by the chelating resin and the cyanide anion passing through the system. The cationic resin can then be readily regenerated using sulfuric acid to produce a concentrated acidic solution of the metal ion and the metal recovered using standard processing techniques such as electrolytic deposition which converts the ion to elemental metal. The cyanide ion passing through the system can be recovered using an anionic resin or decomposed using standard alkaline chlorination.

FIG. 1 illustrates schematically a particular version of the process for recovering free cadmium metal from a cadmium cyanide complex in water. In the illustrated configuration, the system 10 includes three resin columns 12, 14, 16, each containing an iminodiacetate cation chelating material, such as Rohm and Haas Amberlite® IRC-718. An aqueous solution containing a cyanide complex 11 is fed from a plating bath rinse tank 18 through a feed system 20 into first and second resin columns 12, 14 (a lead column and a polish column) placed in series until the first column (the lead column) is exhausted, as evidenced by heavy metal breakthrough (an increase in the heavy metal content of the feed stream) monitored between the lead and polish columns. The first column is then taken off stream for regeneration, the second column becomes the lead column and the third column becomes the polish column. Once the first column is regenerated it becomes the backup column to the other two columns. The depleted solution 22, substantially free of heavy metal ions but containing a dissolved cyanide salt, exiting the polish column is then fed to further processing vessels 24 for cyanide removal by an anionic resin, membrane separation or alkaline chlorination. The exhausted column, which now has a heavy concentration of heavy metal, such as cadmium, is washed with water to remove any residual cyanide and treated with 10% sulfuric acid fed from the acid tank 26 to remove the metal ion in the form of a soluble metal sulfate, such as $CdSO_4$. Once depleted of its removable metal content, the resin is washed with water and converted to the sodium form by passing 5% NaOH fed from the hydroxide tank 28, therethrough.

While FIG. 1 shows three resin columns and equipment for recovering or regenerating the effluent streams one skilled in the art will recognize that one or two columns can be used and the process can be performed in a semi-continuous or batch mode. Also the effluent streams containing anions or cations can be recovered, recycled, processed or collected for separate treatment or disposal. Also, other comparable regenerating solutions, such as potassium hydroxide, may be used. Thus, it is not necessary that all of the processing steps shown in FIG. 1 be performed or that they be performed in a continuous mode.

Typical design and operating conditions are listed in Tables 1 and 2. However, these conditions are given as examples and are not necessarily critical to the operation. In particular, the column sizes and flow rates are not critical to the invention. Depending on the quantity of other cations (Ca, Mg, Na, etc) in the wash water (city water has significant quantities of dissolved alkali metals,) the resin capacity for cadmium varied from 75 meq/L to 630 meq/L with the average capacity when RO water was used in place of city water for rinsing being about 480 meq/L.

The cadmium recovery (actual Cd capacity), through put until full column saturation (complete breakthrough) and through put until regulatory limits are reached in the outflow (Regulatory Breakthrough) in 13 processing runs with high and low feed stream Cd concentrations and either RO or city water (CW), are shown in Table 3. It was found that the presence of other cations in the feed stream (use of city water) resulted in a reduction of the removal of the heavy metals by the chelating resin. Use of RO water produced the highest resin capacity with up to 290 times the bed volume being processed before regulatory limits in the outlet stream were reached.

TABLE 1

DESIGN PARAMETERS

| Parameter | Quantity |
|---|---|
| Pilot Plant Operating Schedule | 24 hrs/day (7 days/week) |
| Wastewater input flow rate | 150 gpd |
| $Cd^{2+}$ Concentration | 23 mg/L |
| CN– Concentration | 23 mg L |
| Cation Column | |
| Diameter | 3 in |
| Length | 10 in |
| Flow-through Rate | 20 BV/hr |
| Hydraulic Loading | 83 L/min-$m^2$ |
| Resin Capacity | 600 meq/L |
| Bed Volume (BV) | 2.2 L/column |
| Anion Column | |
| Diameter | 4 in |
| Length | 12 in |
| Flow-through Rate | 10 BV/hr |
| Hydraulic Loading | 71.3 L/min-$m^2$ |
| Resin Capacity | 400 meq/L |
| Bed Volume (BV) | 2.5 L/column |
| Electrolytic Recovery Unit | |
| Capacity | 20 L |
| Cathodes | 1 s.f. Stainless Steel |
| Anodes | 1 s.f. Stainless Steel |
| Rectifier | 100 A, 110 V |

TABLE 2

OPERATING PARAMETERS

| Parameter | Quantity |
|---|---|
| Cation Columns | |
| Initial Rinse Flow Rate | 0.38 L/min |
| Initial Rinse Volume | 3.5 L |
| Regeneration Flow Rate | 0.04–0.08 L/min |
| Acid Requirement | 6–12 lbs $H_2SO_4/ft^3$ |
| Volume of Regenerant | 1.87 L 10% $H_2SO_4$ solution |
| Slow Rinse Flow Rate | 0.04–0.08 L/min |
| Slow Rinse Volume | 1.2 |
| Fast Rinse Flow Rate | 0.38 L/min |
| Fast Rinse Volume | 10.5 L |
| Neutralization Flow Rate | 0.04–0.08 L/min |
| NaOH Requirement | 4 lbs $NaOH/ft^3$ |
| Volume of Neutralization Solution | 1.32 L 5% NaOH solution |
| Final Rinse Flow Rate | 0.38 L/min |
| Final Rinse Volume | 2.5 L |
| Anion Columns | |
| Initial Rinse Flow Rate | 0.38 L/min |
| Initial Rinse Volume | 7.4 L |
| Regeneration Flow Rate | 0.08–0.16 L/min |
| NaOH Requirement | 4 lbs $NaOH/ft^3$ |
| Volume of Regenerant | 3 L |
| Slow Rinse Flow Rate | 0.08–0.17 L/min |
| Slow Rinse Volume | 2.5 L |
| Fast Rinse Flow Rate | 0.38 L/min |
| Fast Rinse Volume | 22 L |

Regeneration of the column with $H_2SO_4$ released substantially all of the bound cadmium at a concentration of about 1200 mg/L. Approximately 97% of the cadmium was then recovered as elemental cadmium in an electrolytic recovery unit 30.

Some advantages of the process described above are that, contrary to the referenced literature, metals can be removed from cyanide complexes in water using standard chelating cationic resins in an unconventional manner without resin degeneration or the potential of hydrogen cyanide gas formation and release. At the same time, heavy metals, such as cadmium, are removed in a form suitable for recovery or recycling to the plating baths instead of disposal as toxic sludge.

may also be used for regeneration of the resin. Further, while sodium hydroxide is the preferred base for converting the chelating resin to the sodium form, other bases which will convert the resin to a usable form may be used. Therefore, the spirit and scope of the appended claims should not be limited to the description of the preferred version contained herein, or the typical operating conditions or design parameters set forth above.

What is claimed is:

1. A process for removing cations from a negatively charged chelate or complex of the cation with an anion, the complex being dissolved in an aqueous feed stream having a pH greater than 7.0, comprising:

TABLE 3

TEST RESULTS

| | | Feed Characterization | | | | Column Spec. | | Cation Column Results | | |
|---|---|---|---|---|---|---|---|---|---|---|
| Run Number | Process Water | Cd (Mg/L) | Cation (meq/L) | Cation-Cd Molar Ratio | Flow Rate (ml/min) | Bed Vol (L) | Flow Rate (BV/hr) | Actual Cd Capacity (meq/L) | Complete Break-through (BV) | Regulatory Break-through (BV) |
| BC-1 | CW low Cd | 18 | 14 | 87 | 200 | 1.2 | 10 | — | — | — |
| BC-2 | CW low Cd | 18 | 14 | 87 | 300 | 1.2 | 15 | 75 | 325 | 150 |
| BC-3 | CW low Cd | 21 | 14 | 75 | 500 | 1.2 | 25 | — | — | 160 |
| BC-4 | CW low Cd | 22 | 12 | 61 | 400 | 2.2 | 11 | — | — | 250 |
| BC-5 | CW low Cd | 18 | 12 | 75 | 400 | 2.2 | 11 | — | — | — |
| BC-6 | CW low Cd | 29 | 16 | 62 | 360 | 2.2 | 10 | 140 | 310 | 200 |
| BC-7 | CW low Cd | 30 | 15 | 56 | 370 | 2.2 | 10 | 230 | 440 | 260 |
| Average for City Water Runs with Low Cd | | 22 | 14 | 72 | 361 | 1.8 | 13 | 148 | 358 | 204 |
| BC-8 | RO Water | 28 | 6.1 | 24 | 530 | 2.2 | 14 | 340 | 1140 | 270 |
| BC-9 | RO Water | 28 | 6.1 | 24 | 700 | 2.2 | 19 | 630 | 1600 | 290 |
| BC-10 | RO Water | 29 | 6.1 | 24 | 700 | 2.2 | 19 | — | — | 290 |
| Average for City Water Runs with Low Cd | | 28 | 6.1 | 24 | 643 | 2.2 | 18 | 485 | 1370 | 283 |
| BC-11 | RO (D.O.) | 50 | 19 | 43 | 760 | 2.2 | 21 | 420 | 750 | 170 |
| BC-12 | CW high Cd | 68 | 17 | 28 | 430 | 2.2 | 12 | 330 | 380 | 120 |
| BC-13 | CW high CD | 83 | 19 | 26 | 550 | 2.2 | 15 | 520 | 390 | 110 |
| Average for City Water Runs with Low Cd | | 76 | 18 | 27 | 490 | 2.2 | 13 | 425 | 385 | 115 |

Although the present invention has been described in considerable detail with reference to certain preferred versions and uses thereof, other versions and uses are possible. For example, the process set forth above for recovering cyanide complexed cadmium can be applied to the removal from a solvent system of any ion, such as a metal ion having a positive charge, complexed or chelated with a second ion of an opposite charge, such that the complex or chelate has a neutral charge or a charge opposite to that of the metal ion itself (i.e. a complexed cation has a negative charge), by contacting the complex with a chelating resin with active sites on the resin chelate oppositely charged to the ion if unbound (i.e., the metal ion) and the same charge as the chelated ion. In this manner, negatively or neutrally charged chelates or complexes of various metals including, but not limited to, mercury, copper, gold, silver, lead, nickel, zinc, cobalt, iron, magnesium, cadmium and calcium can be removed from a basic (pH $\geqq$7.0), aqueous feed stream by passing the solution over a cationic chelating resin. While cyanide is a typical complexing agent, one skilled in the art would recognize that the metal may be bound to other complexing or chelating agents. Further, while sulfuric acid is the preferred acid for removing the metal ion from the resin, other acids which form soluble salts with the metal ion a) passing the aqueous feed stream over a cationic chelating ion exchange resin in the sodium form to release said cation from the complex, binding said cation to the resin and forming an anionic effluent containing the anion as a soluble salt, the effluent being substantially free of said cation, and;

b) regenerating the chelating ion exchange resin by first passing a strong acid solution over the resin to remove substantially all of said cations from the resin, forming an acidic effluent containing a water soluble salt of said cation and then passing a basic solution over said resin to convert the resin to the sodium form.

2. The process of claim 1 wherein said cation is a metal ion.

3. The process of claim 1 wherein said strong acid is sulfuric acid.

4. The process of claim 1 wherein said cation is selected from the group consisting of mercury, copper, lead, nickel, zinc, cobalt, gold, silver, iron, magnesium, cadmium and calcium ions.

5. The process of claim 1 wherein said cation is cadmium and said anion is cyanide.

6. The process of claim 1 wherein the pH of the feed stream is greater than 8.5.

7. A process for removing and recycling cations which are complexed or chelated with an anion, the resultant complex or chelate being dissolved in an aqueous solution having a pH greater than 7.0, comprising:

a) contacting said aqueous solution with a cationic chelating ion exchange resin in the sodium form to release said cation from said complex, binding said cation to the resin and forming an effluent containing said anion, the effluent being substantially free of said cation, and;

b) regenerating said chelating ion exchange resin by first passing a strong acid solution over the resin to remove substantially all of said cations from the resin, forming an acidic effluent containing said cation, and then passing a basic solution over the resin to convert the resin to the sodium form, and;

c) removing said cation from said acidic effluent in an elemental form.

8. The process of claim 7 wherein said cation is a metal ion.

9. The process of claim 7 wherein said strong acid is sulfuric acid.

10. The process of claim 7 wherein said cation is selected from the group consisting of mercury, copper, lead, nickel, zinc, cobalt, gold, silver, iron, magnesium, cadmium and calcium ions.

11. The process of claim 10 wherein said acidic effluent is fed to an electrolytic recovery unit, and said cation is converted to elemental metal.

12. The process of claim 7 wherein the pH of the feed stream is greater than 8.5.

13. A process for removing and recycling cations which are complexed or chelated with an anion, the resultant complex or chelate being dissolved in an aqueous solution having a pH greater than 7.0, comprising:

a) contacting the aqueous solution with a cationic chelating ion exchange resin in the sodium form to release said cation from said complex, binding said cation to the resin and forming an effluent containing said anion, the effluent being substantially free of said cation, and;

b) regenerating the chelating ion exchange resin by first passing a strong acid solution over said resin to remove substantially all of said cations from the resin, forming an acidic effluent containing the cations, and then passing a basic solution over the resin to convert the resin to the sodium form, and;

c) removing said cations from the acidic effluent in an elemental form, and;

d) further processing the effluent to convert the anion to a less toxic form.

14. The process of claim 13 wherein said cation is a metal ion.

15. The process of claim 13 wherein said strong acid is sulfuric acid.

16. The process of claim 13 wherein said cation is selected from the group consisting of mercury, copper, lead, nickel, zinc, cobalt, gold, silver, iron, magnesium, cadmium and calcium ions.

17. The process of claim 13 wherein the pH of the feed stream is greater than 8.5.

18. The process of claim 13 wherein said effluent containing said anion is fed to a processing stage for chlorination and alkali treatment.

19. A process for removing cations from a negatively charged chelate or complex of the cation with an anion, the complex being dissolved in an aqueous feed stream having a pH greater than 7.0, comprising passing the aqueous feed stream over a cationic chelating ion exchange resin in the sodium form to release said cation from the complex, binding said cation to the resin and forming an anionic effluent containing the anion as a soluble salt, the effluent being substantially free of said cation.

20. The process of claim 19 wherein said cation is a metal ion.

21. The process of claim 19 wherein said cation is selected from the group consisting of mercury, copper, lead, nickel, zinc, cobalt, gold, silver, iron, magnesium, cadmium and calcium ions.

22. Process of claim 19 wherein said cation is cadmium and said anion is cyanide.

23. The Process of claim 19 wherein the pH of the feed stream is greater than 8.5.

* * * * *